United States Patent
Wada

(10) Patent No.: US 7,215,613 B2
(45) Date of Patent: May 8, 2007

(54) OPTICAL DISK APPARATUS

(75) Inventor: Kozo Wada, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 488 days.

(21) Appl. No.: 10/761,385

(22) Filed: Jan. 22, 2004

(65) Prior Publication Data

US 2004/0151093 A1   Aug. 5, 2004

(30) Foreign Application Priority Data

Jan. 23, 2003   (JP) .................... P2003-015143

(51) Int. Cl.
*G11B 5/09* (2006.01)
(52) U.S. Cl. .............. 369/47.26; 369/53.34; 369/124.04; 369/124.13
(58) Field of Classification Search ............ None
See application file for complete search history.

(56) References Cited

U.S. PATENT DOCUMENTS 6,680,892 B2 * 1/2004 Mashimo ............ 369/59.17
6,999,388 B2 * 2/2006 Mashimo et al. ........ 369/44.29

FOREIGN PATENT DOCUMENTS

| JP | 2001-23167 | 1/2001 |
|---|---|---|
| JP | 2001-126261 A | 5/2001 |
| JP | 2001-307332 | 11/2001 |
| JP | 2002-8243 | 1/2002 |
| JP | 2002-008243 A | 1/2002 |

\* cited by examiner

*Primary Examiner*—Muhammad Edun
(74) *Attorney, Agent, or Firm*—Morgan, Lewis & Bockius, LLP

(57) ABSTRACT

Without waiting for the rotational speed of an optical disk reaches a rotational speed (Vb) for a reproduction process, a cutoff frequency (Fca) of an RF signal and a boost amount (Bt) for an equalizer circuit are detected, and, with using the rotational speed (Va) of the optical disk at this detection, the cutoff frequency (Fc) by which jitter of the RF signal is optimized when the optical disk is rotated at the rotational speed (Vb) for the reproduction process is calculated by the equation of Fc=Fca+k(Vb−Va), and then set. Therefore, the time between the timing when the user conducts an input operation for starting reproduction, and that when reproduction is actually started can be shortened, and the usability can be improved.

4 Claims, 4 Drawing Sheets

OPTICAL DISK APPARATUS

BACKGROUND OF THE INVENTION

1. Field of the Invention

The present invention relates to an optical disk apparatus which reproduces information from an optical disk such as a DVD or a CD set to a main unit thereof.

2. Description of the Related Art

In an optical disk apparatus which reproduces information from an optical disk such as a DVD or a CD, conventionally, equalizer adjustment is applied on an RF signal (an RF signal output from a pickup head) which is read out from an optical disk set to a main unit. As well known in the art, an RF signal which is read out from an optical disk contains various frequency components, and the level of the signal is lower as the frequency is higher. As the level of the signal is lower, jitter is worse. Equalizer adjustment is a process for optimizing jitter of an RF signal, and more specifically a process in which, with respect to an RF signal read out from an optical disk, components higher than a certain frequency are cut off, and boosting is performed.

The cutoff frequency (Fc) of an RF signal and the boost amount (Bt) which are used in equalizer adjustment are varied depending on the data recording density, the signal quality, and the like in an optical disk to be reproduced (an optical disk set to the main unit of the optical disk apparatus), and hence must be set in accordance with the optical disk set to the main unit. In a conventional optical disk apparatus, therefore, the cutoff frequency (Fc) of an RF signal and the boost amount (Bt) by which jitter is optimized are detected for the optical disk set to the main unit prior to the reproduction process (see Patent References 1, 2). In the reproduction process, equalizer adjustment is performed on the basis of the cutoff frequency (Fc) and the boost amount (Bt) which are detected as described above.

Particularly, in JP-A-2001-126261, there is disklosed a configuration in which, in order to optimize jitter in accordance with the reproduction position (the inner peripheral side or the outer peripheral side) of an optical disk, the cutoff frequency (Fc) of an RF signal and the boost amount (Bt) are changed in accordance with the reproduction position of the optical disk. In JP-A-2002-008243, there is disklosed a configuration in which a process of detecting the cutoff frequency (Fc) of an RF signal and the boost amount (Bt) is simplified and the time period of the process is shortened.

In a conventional optical disk apparatus, the RF signal cutoff frequency (Fc) and the boost amount (Bt) for optimizing jitter are detected under the state where an optical disk set to a main unit is rotated at a speed for a reproduction process (the predetermined rotational speed in the invention). Specifically, when the user applies an input operation for starting the process of reproducing the optical disk on the main unit, the optical disk set to the main unit starts to be rotated, and, after the rotational speed of the optical disk reaches the rotational speed for the reproduction process, the RF signal cutoff frequency (Fc) and the boost amount (Bt) are detected.

As described above, a conventional optical disk apparatus is configured so that, after the rotational speed of the optical disk reaches the rotational speed for the reproduction process, the RF signal cutoff frequency (Fc) and the boost amount (Bt) are detected. Consequently, there is a waiting time between the start of the rotation of the optical disk and the timing when the rotational speed of the optical disk reaches the rotational speed for the reproduction process. Because of the waiting time, the time between the timing when the user conducts an input operation for starting reproduction, and that when reproduction of the optical disk is actually started, i.e., the time for which the user must wait is prolonged, thereby causing a problem in that the usability of such an apparatus is poor.

SUMMARY OF THE INVENTION

It is therefore an object of the invention to provide an optical disk apparatus in which the time between the timing when the user conducts an input operation for starting reproduction, and that when reproduction of an optical disk is actually started can be shortened, whereby the usability is improved.

In order to solve the problems, according to one aspect of the invention, there is provided an optical disk apparatus including: a rotating section configured to rotate an optical disk; a reading section configured to irradiate a laser beam on the optical disk, to receive a reflected beam reflected from the optical disk, and to output an RF signal in which being modulated in accordance with a modulation of the reflected beam; an equalizer section configured to adjust a frequency characteristic of the RF signal output from the reading section, based on a cutoff frequency and a boost amount which are previously set; a reproducing section configured to generate and output a reproduced signal from the RF signal adjusted by the equalizer section; a jitter detecting section configured to detect a jitter with respect to the RF signal output from the reading section at a time when the rotating section starts rotating the optical disk and a rotational speed (Va) of the optical disk not being reached to a predetermined rotational speed (Vb); and a setting section configured to calculate a cutoff frequency (Fca) for optimizing the jitter in which detected by the jitter detecting section, and to calculate and set a cutoff frequency (Fc) for optimizing the jitter with respect to the RF signal output from the reading section at a time when the optical disk being rotating at the predetermined rotational speed, based on the cutoff frequency (Fca), the rotational speed (Va), the predetermined rotational speed (Vb), and a preset proportionality factor (k), wherein the equalizer section adjusts the frequency characteristic of the RF signal output from the reading section on the basis of the cutoff frequency (Fc) set by the setting section.

According to the aspect of the invention, after the rotation of the optical disk is started and before the rotational speed of the optical disk reaches the predetermined rotational speed (the speed for a reproduction process), the jitter detecting section detects the cutoff frequency (Fc) for optimizing jitter with respect to the RF signal output from a pickup head serving as the reading section.

With using the cutoff frequency (Fca) and the boost amount (Bt) for optimizing the RF signal which are detected before the predetermined rotational speed (Vb) is attained, and the rotational speed (Va) of the optical disk at the timing when these values are detected, the setting section may be configured to calculate and set the cutoff frequency (Fc) for optimizing jitter of the RF signal which is read out from the optical disk that is rotated at the predetermined rotational speed (Vb).

The inventor of the invention has ascertained that there is a proportional relationship between a rotational speed (V) of an optical disk and a cutoff frequency (Fc) for optimizing jitter. Specifically, the relationship as follows:

$$Fc = kV + A$$

where k is a proportionality factor, and A is a constant value.

It has been ascertained also that the proportionality factor (k) is a value which is determined by the hardware configuration of an apparatus, and A is a value which is varied depending on an optical disk. It has been ascertained also that a boost amount (Bt) is substantially unchanged depending on a rotational speed of the optical disk.

When the proportionality factor (k) is previously set into the main unit, therefore, the cutoff frequency (Fc) for optimizing jitter of the RF signal which is read out from the optical disk that is rotated at the predetermined rotational speed (Vb) can be calculated by the following equation:

$$Fc=Fca+k(Vb-Va)$$

As described above, the proportionality factor (k) is a value which is determined by the hardware configuration of an apparatus. Therefore, the proportionality factor can be previously set.

Since the boost amount (Bt) for optimizing jitter of the RF signal is substantially unchanged depending on a rotational speed of an optical disk, the boost amount (Bt) which is detected from the jitter detected by the jitter detection section can be set as a boost amount to be used in the reproducing before the rotational speed of the optical disk reaches the predetermined speed.

The equalizer section may be configured to adjust the frequency characteristic of the RF signal (optimizes jitter), on the basis of the cutoff frequency (Fc) which is set by the setting section, and the boost amount (Bt). And the reproducing section may be configured to produce a reproduced signal (audio and video signals) from the adjusted RF signal, and outputs the reproduced signal.

According to the above configuration, the cutoff frequency (Fc) and the boost amount (Bt) can be set without waiting for the rotational speed of the optical disk to reach the predetermined speed (the rotational speed for the reproduction process). Therefore, the time between the timing when the user conducts an input operation for starting reproduction, and that when reproduction is actually started can be sufficiently shortened, and the usability can be improved.

The reproducing section may be configured to start to generate and output the reproduced signal immediately after the jitter is detected by the jitter detecting section, thereby to start the reproduction process without waiting for the rotational speed of the optical disk to reach the predetermined rotational speed. According to the configuration, the time between the timing when the user conducts an input operation for starting reproduction, and that when reproduction is actually started can be further shortened.

In the above configuration, the cutoff frequency which is used by the equalizer section in the adjustment of the frequency characteristic of the RF signal output from the reading section during the period before the rotational speed of the optical disk reaches the predetermined rotational speed may be one of the followings:

(1) the cutoff frequency (Fca) detected by the jitter detecting section;

(2) the cutoff frequency (Fc) calculated by the setting section; and (3) a cutoff frequency which is stepwise changed from the cutoff frequency (Fca) detected by the jitter detecting section, to the cutoff frequency (Fc) calculated by the setting section in accordance with the increase of the rotational speed of the optical disk.

As the boost amount (Bt) during this period, the boost amount (Bt) which is detected by the jitter detection section is used. In any of above cases (1) to (3), when the rotational speed of the optical disk reaches the predetermined rotational speed, the equalizer section adjusts the frequency characteristic of the RF signal output from the reading section, on the basis of the cutoff frequency (Fc) which is set by the setting section, and the boost amount (Bt).

BRIEF DESCRIPTION OF THE DRAWINGS

The above objects and advantages of the present invention will become more apparent by describing a preferred embodiment thereof in detail with reference to the accompanying drawings, wherein.

DETAILED DESCRIPTION OF THE PREFERRED EMBODIMENTS

Referring now to the accompanying drawings, a description will be given in detail of an optical disk apparatus according to a preferred embodiment of the invention.

Figure 1:
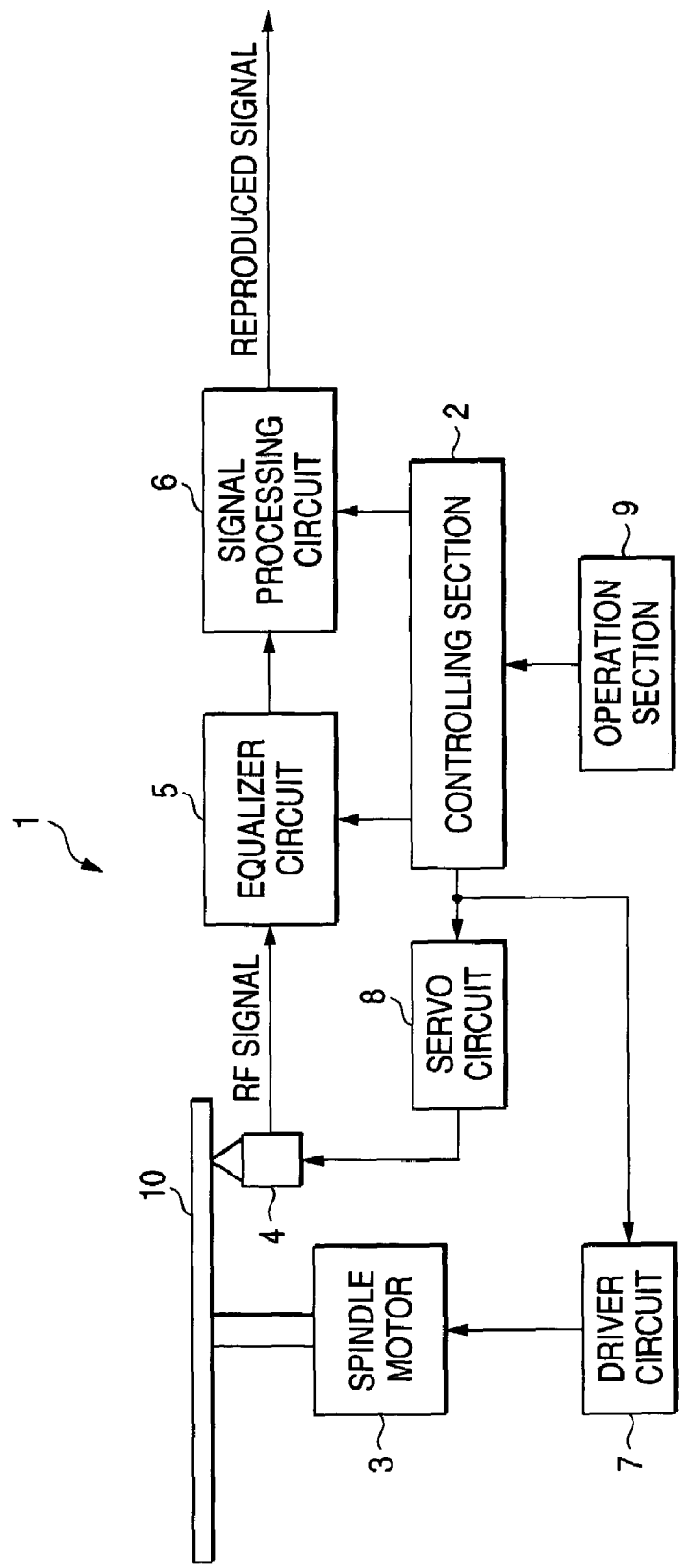
FIG. 1 is a block diagram showing the configuration of an optical disk apparatus according to an embodiment of the invention.

FIG. 1 is a block diagram showing the configuration of an optical disk apparatus which is an embodiment of the invention. The optical disk apparatus 1 of the embodiment includes: a controlling section 2 (which corresponds to a setting section of the invention) which controls the operation of the accompanying sections; a spindle motor 3 (which corresponds to a rotating section of the invention) which rotates an optical disk 10 such as a CD or a DVD set to a main unit of the apparatus; a pickup head 4 (which corresponds to a reading section of the invention) which irradiates the optical disk 10 set to the main unit with a laser beam, and which receives the beam reflected from the disk to output an RF signal; an equalizer circuit 5 (which corresponds to an equalizer section of the invention) which adjusts the frequency characteristic of the RF signal output from the pickup head 4; and a signal processing circuit 6 (which corresponds to a reproducing section and a jitter detecting section of the invention) which produces a reproduced signal (audio and video signals) from the RF signal having the frequency characteristic that is adjusted by the equalizer circuit 5, and which outputs the reproduced signal. The optical disk apparatus further includes: a driver circuit 7 which controls the rotation of the spindle motor 3; a servo circuit 8 which controls the focus servo and tracking servo operations in the pickup head 4; and an operation section 9 on which the user performs an input operation.

As well known, a four-divided light receiving element (PD) is disposed in the pickup head 4 in order to obtain a focus error signal and a tracking error signal. In the equalizer circuit 5, the frequency characteristic of the RF signal output from the pickup head 4 is adjusted by a process of cutting off components which are higher than a preset cutoff frequency (Fc) and performing boosting on the basis of the preset boost amount (Bt). The cutoff frequency (Fc) and the boost amount (Bt) are set by a process which will be described later. The signal processing circuit 6 demodulates the RF signal in which the frequency characteristic is adjusted by the equalizer circuit 5, applies an error correction on the signal, and outputs audio and video signals which are obtained by decoding the corrected signal, as the reproduced signal. The servo circuit 8 performs the focusing and tracking controls on the basis of the focus error signal and the tracking error signal (not shown) which are output from the pickup head 4.

Figure 2:
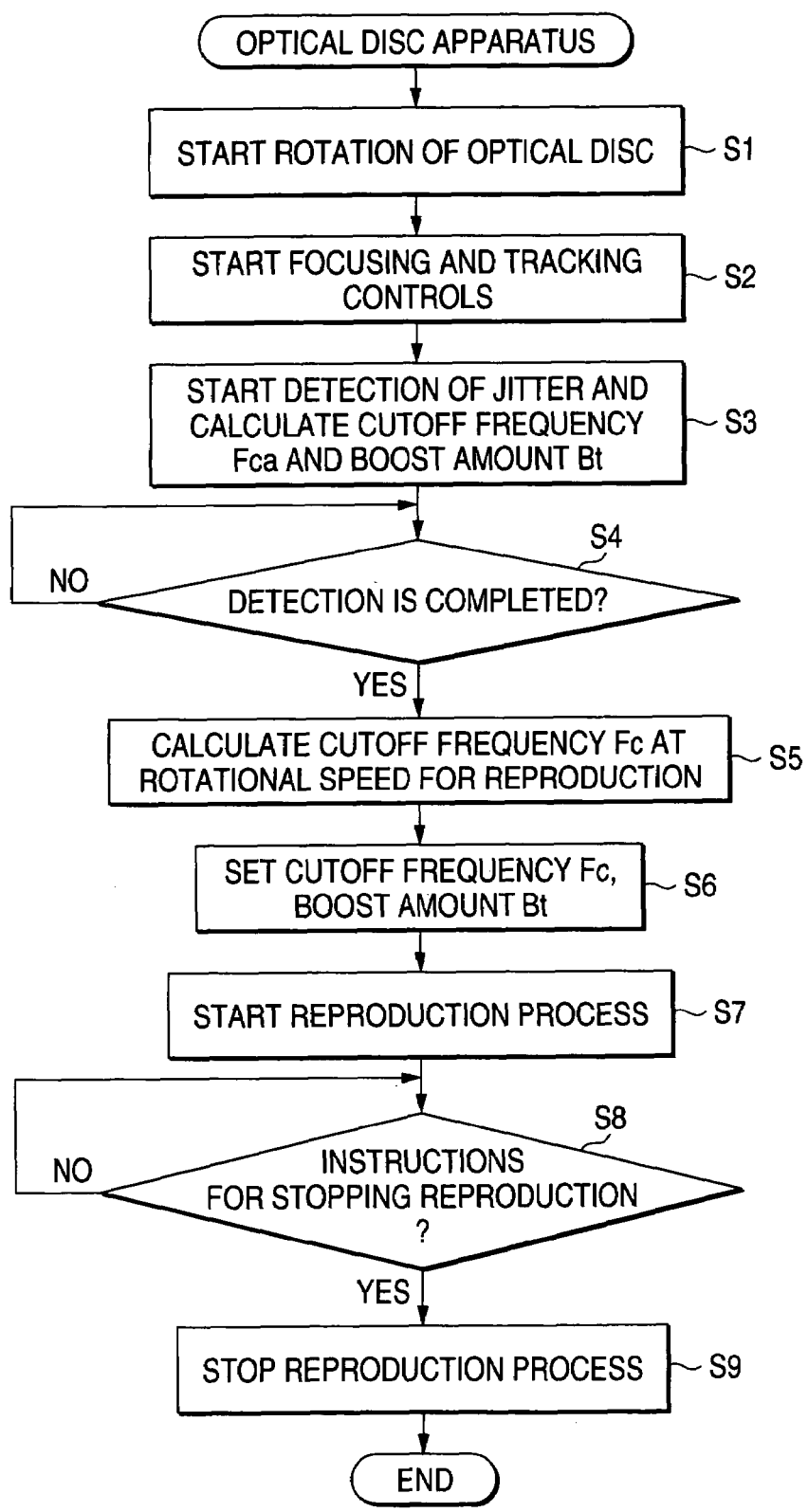
FIG. 2 is a flowchart showing the operation in a reproduction process in the optical disk apparatus according to the embodiment.

The operation in the reproduction process which is conducted on the optical disk 10 in the optical disk apparatus 1 of the embodiment will be described. FIG. 2 is a flowchart showing the operation in the reproduction process in the optical disk apparatus of the embodiment of the invention.

In response to instructions for starting reproduction, the optical disk apparatus 1 starts the process. For example, when a reproduction key disposed in the operation section 9 is operated, when the apparatus receives a command instructing the start of the reproduction process which is transmitted from a remote controller (not shown), or when the optical disk 10 is set to the main unit, the process is started.

Figure 3:
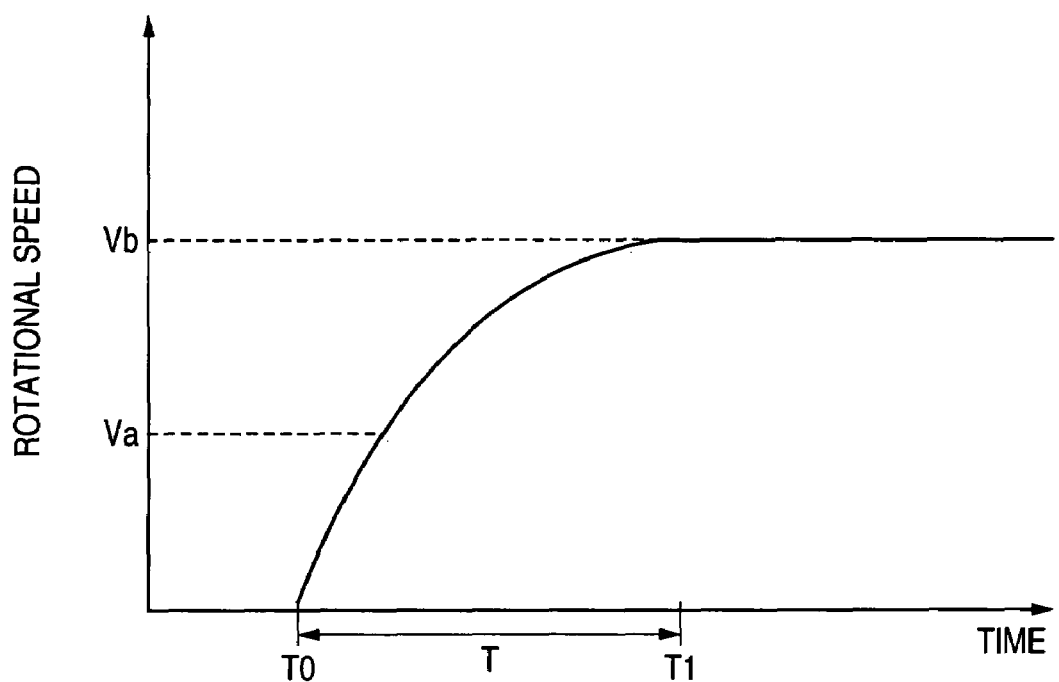
FIG. 3 is a view illustrating the control of the rotational speed of an optical disk in the reproduction process.

In the optical disk apparatus 1, first, the optical disk 10 which is set to the main unit starts to be rotated (the rotation of the spindle motor 3 is started) (step S1). As shown in FIG. 3, the rotation of the optical disk 10 set to the main unit is started in step S1, and the rotational speed reaches a preset rotational speed (the predetermined rotational speed in the invention) after elapse of a time T. In FIG. 3, T0 is the timing when the rotation of the optical disk 10 is started, and T1 is that when the rotational speed of the optical disk 10 reaches the predetermined rotational speed Vb.

After the rotation of the optical disk 10 set to the main unit is started in step S1, the optical disk apparatus 1 starts the focusing and tracking controls of the servo circuit 8 without waiting for the rotational speed to reach the rotational speed (Vb) for the reproduction process (step S2). In the focusing control, the focal position of the laser beam impinging on the optical disk 10 is made coincident with a data recording plane of the optical disk 10, and, in the tracking control, the irradiation position of the laser beam impinging on the optical disk 10 is made coincident with the center of a track of the optical disk 10. The focusing and tracking controls of the servo circuit 8 are known, and hence their description is omitted.

After starting the focusing and tracking controls, the signal processing unit 6 starts detection of the jitter and the controlling section 2 starts calculating the cutoff frequency of the RF signal and the boost amount for equalizer adjustment from the jitter detected by the signal processing unit 6 (step S3). At the timing when the calculation (detection) of the cutoff frequency of the RF signal and the boost amount is started in step S3, usually, the time T has not yet elapsed after the rotation of the optical disk 10 set to the main unit is started in step S1, and therefore the rotational speed (Va) of the optical disk 10 set to the main unit has not yet reached the rotational speed (Vb) for the reproduction process.

Figure 4:
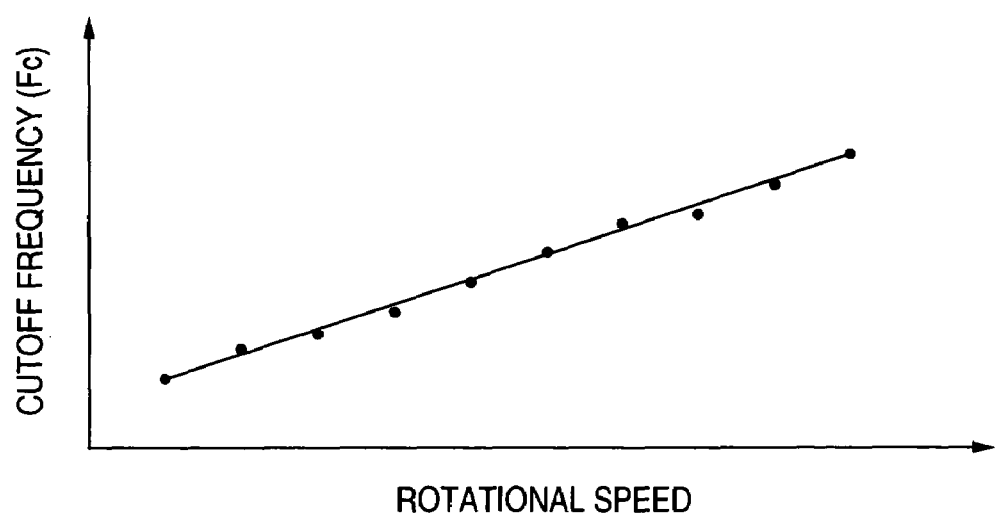
FIG. 4 is a view showing a relationship between the rotational speed of the optical disk and a cutoff frequency Fc of an RF signal.

The inventor of the invention has ascertained by experiments that there is a proportional relationship between the rotational speed of the optical disk set to the main unit and the RF signal cutoff frequency for optimizing jitter. Specifically, as shown in FIG. 4, there is the following relationship between the rotational speed (V) of the optical disk and the cutoff frequency (Fc) for optimizing jitter:

$$Fc = kV + A$$

where k is a proportionality factor, and A is a constant.

It has been ascertained also that the proportionality factor (k) is a value which is determined by the hardware configuration of an apparatus, and A is a value which is varied depending on the optical disk 10 set to the main unit. It has been ascertained also that the boost amount (Bt) is substantially unchanged depending on the rotational speed of the optical disk.

While increasing the rotational speed of the optical disk 10 set to the main unit toward the rotational speed (Vb) for the reproduction process, the optical disk apparatus 1 conducts the process of step S3. Also, while detecting the rotational speed of the optical disk 10, the optical disk apparatus 1 detects the cutoff frequency (Fca) of the RF signal and the boost amount (Bt) by which jitter is optimized.

When the detection of the cutoff frequency (Fca) and the boost amount (Bt) by which jitter is optimized is completed (step S4), the optical disk apparatus 1 calculates the cutoff frequency (Fc) of the RF signal by which jitter is optimized at the rotational speed (Vb) for the reproduction process (s5). In step S5, with using the detected the cutoff frequency (Fca) of the RF signal by which jitter is optimized, the rotational speed (Va) of the optical disk 10 at this timing, and the rotational speed (Vb) for the reproduction process, the cutoff frequency (Fc) of the RF signal by which jitter is optimized at the rotational speed (Vb) for the reproduction process is calculated by the equation of:

$$Fc = Fca + k(Vb - Va).$$

The optical disk apparatus 1 sets the cutoff frequency (Fc) of the RF signal which is calculated in step S5, and the boost amount (Bt) which is detected in the process of steps S3 and S4, as adjustment values in the equalizer circuit 5 (step S6).

When the cutoff frequency Fc of the RF signal and the boost amount are set in step S6, the optical disk apparatus 1 starts the process of reproducing the optical disk 10 set to the main unit (step S7). At this time, even when the rotational speed of the optical disk 10 set to the main unit has not yet reached the rotational speed for the reproduction process, the optical disk apparatus 1 starts the process of reproducing the optical disk 10 the signal processing section 6 can start to generate and output the reproduced signal immediately after the jitter is detected by the signal processing section 6.

Thereafter, until receiving instructions for stopping the reproduction process, the optical disk apparatus 1 continues the process of reproducing the optical disk 10 which is started in step S7 (steps S8 and S9). For example, when a stop key disposed in the operation section 9 is operated, or when the apparatus receives a command instructing the stop of the reproduction process which is transmitted from the remote controller (not shown), the reproduction process is stopped. Then the process is ended.

Figure 5:
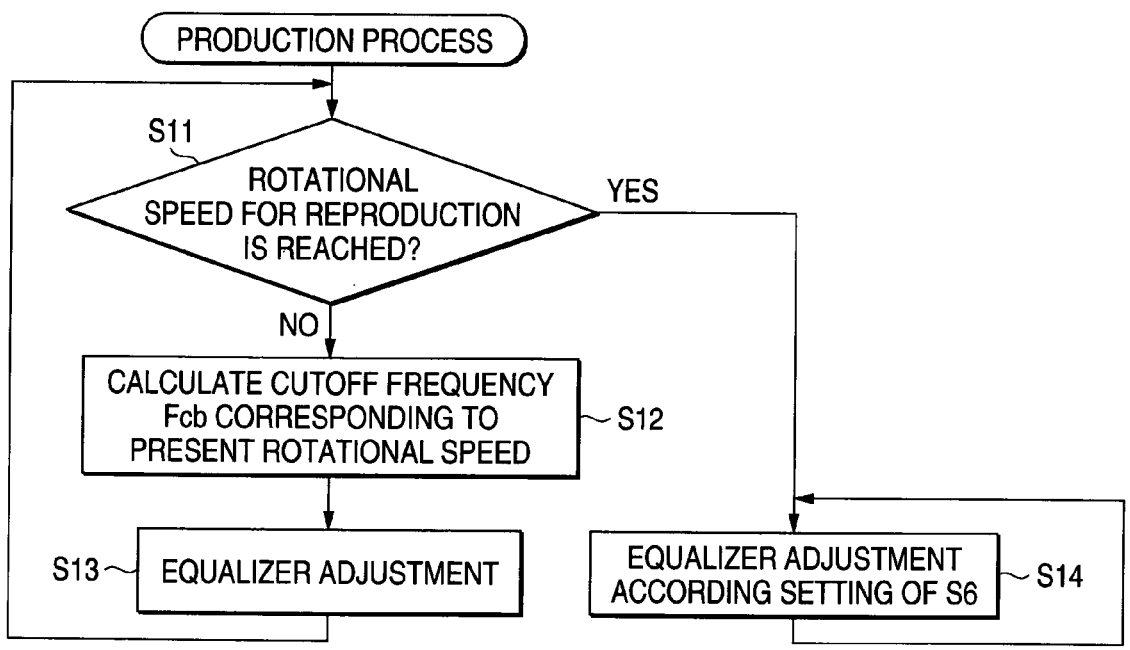
FIG. 5 is a flowchart showing the reproduction process in the optical disk apparatus according to the embodiment.

The reproduction process which is started in step S7 will be described in detail. FIG. 5 is a flowchart showing the reproduction process.

In the optical disk apparatus 1, as well known in the art, a light emitting element (LD) disposed in the pickup head 4 irradiates the rotated optical disk 10 with the laser beam, the four-divided light receiving element (PD) receives the beam reflected from the disk to output the RF signal, the focus error signal, and the tracking error signal. Based on the focus error signal and the tracking error signal output from the pickup head 4, the servo circuit 8 performs the focusing and tracking controls. In the focusing control, the focal position of the laser beam impinging on the optical disk 10 is made coincident with the data recording plane of the optical disk 10, and, in the tracking control, the irradiation position of the laser beam impinging on the optical disk 10 is made coincident with the center of a track of the optical disk 10.

The optical disk apparatus 1 determines whether the rotational speed of the optical disk 10 set to the main unit reaches the rotational speed (Vb) for the reproduction process or not (step S11). The RF signal output from the pickup head 4 is supplied to the equalizer circuit 5. In a case where determined in s11 that the rotational speed (Vc) of the optical disk 10 has not yet reached the rotational speed (Vb) for the reproduction process, a cutoff frequency (Fcb) for optimizing jitter of the RF signal output from the pickup head 4 is calculated (step S12). Specifically, the cutoff frequency (Fcb) is calculated by the equation of:

$$Fcb = Fca + k(Vc - Va).$$

In step S12, therefore, the cutoff frequency (Fcb) for optimizing jitter of the RF signal output from the pickup head 4 is calculated with respect to the rotational speed (Vc) of the optical disk 10 at this timing. The equalizer circuit 5 performs equalizer adjustment of cutting off components which are contained in the RF signal supplied from the pickup head 4, and which are higher than the cutoff frequency (Fcb) calculated in step S12 (step S13).

The processes of step S11 through step S13 are repeated until the rotational speed of the optical disk 10 set to the main unit reaches the rotational speed (Vb) for the reproduction process.

In the equalizer adjustment of step S13, the RF signal is boosted by the boost amount which is set in step S6.

The RF signal which has been subjected to equalizer adjustment by the equalizer circuit 5 is supplied to the signal processing circuit 6. The signal processing circuit 6 demodulates the supplied RF signal, and applies an error correction on the demodulated signal. The signal processing circuit 6 decodes the error-corrected signal, and outputs the decoded reproduced signal (audio and video signals).

In the case where no video signal is recorded on the optical disk 10, the signal processing circuit 6 does not output a video signal.

As described above, even when the rotational speed of the optical disk 10 set to the main unit has not yet reached the rotational speed (Vb) for the reproduction process, the optical disk apparatus 1 calculates the cutoff frequency (Fcb) for optimizing jitter of the RF signal, in accordance with the rotational speed (Vc) of the optical disk 10 at the timing, and the equalizer circuit 5 performs equalizer adjustment on the basis of the cutoff frequency (Fcb). Even when, at the timing when the process of reproducing the optical disk 10 set to the main unit is started in step S7, the rotational speed of the optical disk 10 has not yet reached the rotational speed (Vb) for the reproduction process, therefore, the equalizer circuit 5 can perform equalizer adjustment for optimizing jitter of the RF signal output from the pickup head 4.

In the optical disk apparatus 1, if it is determined in step S11 that the rotational speed of the optical disk 10 set to the main unit reaches the rotational speed (Vb) for the reproduction process, the equalizer circuit 5 performs equalizer adjustment on the RF signal output from the pickup head 4, on the basis of the cutoff frequency (Fc) and the boost amount (Bt) which are set in step S6 (step S14).

The processes of FIG. 5 are continued until the reproduction process is ended in step S9.

As described above, the optical disk apparatus 1 of the embodiment is configured so that, without waiting for the rotational speed of the optical disk 10 set to the main unit reaches the rotational speed (Vb) for the reproduction process, the cutoff frequency (Fca) of the RF signal and the boost amount (Bt) for the equalizer circuit 5 are detected, and, with using the rotational speed (Va) of the optical disk 10 at this detection, the cutoff frequency (Fc) by which jitter of the RF signal is optimized when the optical disk 10 is rotated at the rotational speed (Vb) for the reproduction process is calculated and set. Therefore, it is possible to eliminate the waiting time required for the rotational speed of the optical disk 10 to reach the rotational speed (Vb) for the reproduction process. As a result, the time between the timing when the user conducts an input operation for starting reproduction, and that when reproduction is actually started can be shortened, whereby the usability can be improved.

After the cutoff frequency (Fc) by which jitter of the RF signal is optimized when the optical disk 10 is rotated at the rotational speed (Vb) for the reproduction process is calculated and set, the reproduction process is started immediately after the jitter is detected by the jitter detecting section, and even when the rotational speed of the optical disk 10 has not yet reached the rotational speed (Vb) for reproduction. Therefore, the time between the timing when the user conducts an input operation for starting the reproduction process, and that when reproduction is actually started can be further shortened.

When the rotational speed of the optical disk 10 has not yet reached the rotational speed (Vb) for the reproduction process, the cutoff frequency (Fcb) for optimizing jitter of the RF signal is calculated in accordance with the rotational speed (Vc) of the optical disk 10 at this timing, and the equalizer circuit 5 performs equalizer adjustment on the basis of the cutoff frequency (Fcb). Even when the rotational speed of the optical disk 10 has not yet reached the rotational speed (Vb) for the reproduction process, therefore, the equalizer circuit 5 can perform equalizer adjustment by which jitter of the RF signal output from the pickup head 4 is optimized.

The embodiment may be configured so that, when the rotational speed of the optical disk 10 has not yet reached the rotational speed (Vb) for the reproduction process, the equalizer circuit 5 performs equalizer adjustment on the basis of the cutoff frequency (Fca) which is detected in steps S3 and S4, or the cutoff frequency (Fc) which is set in step S6. In this case, although jitter of the RF signal which has undergone equalizer adjustment is slightly lowered until the rotational speed of the optical disk 10 reaches the rotational speed (Vb) for the reproduction process, the processes to be performed by the main unit can be simplified, thereby producing the advantage that the production cost of the main unit can be reduced.

As described above, according to the invention, the time between the timing when the user conducts an input operation for starting reproduction, and that when reproduction is actually started can be shortened, and the usability can be improved.

Although the present invention has been shown and described with reference to a specific preferred embodiment, various changes and modifications will be apparent to those skilled in the art from the teachings herein. Such changes and modifications as are obvious are deemed to come within the spirit, scope and contemplation of the invention as defined in the appended claims.

What is claimed is:

1. An optical disk apparatus comprising:
a rotating section configured to rotate an optical disk;
a reading section configured to irradiate a laser beam on the optical disk, to receive a reflected beam reflected from the optical disk, and to output an RF signal in which being modulated in accordance with a modulation of the reflected beam;

an equalizer section configured to adjust a frequency characteristic of the RF signal output from the reading section, based on a cutoff frequency and a boost amount which are previously set;

a reproducing section configured to generate and output a reproduced signal from the RF signal adjusted by the equalizer section;

a jitter detecting section configured to detect a jitter with respect to the RF signal output from the reading section at a time when the rotating section starts rotating the optical disk and a rotational speed (Va) of the optical disk not being reached to a predetermined rotational speed (Vb); and a setting section configured to calculate a cutoff frequency (Fca) for optimizing the jitter in which detected by the jitter detecting section, and to calculate and set a cutoff frequency (Fc) for optimizing the jitter with respect to the RF signal output from the reading section at a time when the optical disk being rotating at the predetermined rotational speed, based on the cutoff frequency (Fca), the rotational speed (Va), the predetermined rotational speed (Vb), and a preset proportionality factor (k), by use of the following equation:

$$Fc = Fca + k(Vb - Va),$$

wherein the equalizer section adjusts the frequency characteristic of the RF signal output from the reading section on the basis of the cutoff frequency (Fc) set by the setting section, and wherein the reproducing section starts to generate and output the reproduced signal immediately after the jitter is detected by the jitter detecting section.

2. An optical disk apparatus comprising:

a rotating section configured to rotate an optical disk;

a reading section configured to irradiate a laser beam on the optical disk, to receive a reflected beam reflected from the optical disk, and to output an RF signal in which being modulated in accordance with a modulation of the reflected beam;

an equalizer section configured to adjust a frequency characteristic of the RF signal output from the reading section, based on a cutoff frequency and a boost amount which are previously set;

a reproducing section configured to generate and output a reproduced signal from the RF signal adjusted by the equalizer section;

a jitter detecting section configured to detect a jitter with respect to the RF signal output from the reading section at a time when the rotating section starts rotating the optical disk and a rotational speed (Va) of the optical disk not being reached to a predetermined rotational speed (Vb); and a setting section configured to calculate a cutoff frequency (Fca) for optimizing the jitter in which detected by the jitter detecting section, and to calculate and set a cutoff frequency (Fc) for optimizing the jitter with respect to the RF signal output from the reading section at a time when the optical disk being rotating at the predetermined rotational speed, based on the cutoff frequency (Fca), the rotational speed (Va), the predetermined rotational speed (Vb), and a preset proportionality factor (k), wherein the equalizer section adjusts the frequency characteristic of the RF signal output from the reading section on the basis of the cutoff frequency (Fc) set by the setting section.

3. The optical disk apparatus as claimed in claim 2, wherein the reproducing section starts to generate and output the reproduced signal immediately after the jitter is detected by the jitter detecting section.

4. The optical disk apparatus as claimed in claim 2, wherein the setting section calculates the cutoff frequency (Fc) for optimizing the jitter with respect to the RF signal output from the reading section at a time when the optical disk being rotating at the predetermined rotational speed by use of the following equation:

$$Fc = Fca + k(Vb - Va).$$

* * * * *